United States Patent [19]

Swank

[11] Patent Number: 5,233,432
[45] Date of Patent: Aug. 3, 1993

[54] CATHODE-RAY TUBE HAVING IMPLOSION PROTECTION MEANS WITH A STRUCTURE AND METHOD TO FACILITATE ATTACHMENT OF TUBE MOUNTING MEANS

[75] Inventor: Harry R. Swank, Lancaster, Pa.

[73] Assignee: Thomson Consumer Electronics, Indianapolis, Ind.

[21] Appl. No.: 787,425

[22] Filed: Nov. 4, 1991

[51] Int. Cl.⁵ .............................. H04N 5/65
[52] U.S. Cl. .................... 358/246; 358/245
[58] Field of Search ............ 358/245, 246, 247, 248, 358/249; 313/477 R; 220/2.1 A, 2.3 A

[56] References Cited

U.S. PATENT DOCUMENTS

| | | | |
|---|---|---|---|
| 3,777,057 | 12/1973 | Abe | 358/246 |
| 4,360,837 | 11/1982 | Kreidler et al. | 358/246 |
| 4,586,087 | 4/1986 | Parsons et al. | 220/2.3 A |
| 4,668,993 | 5/1987 | Hermann | 220/2.1 A |
| 5,036,577 | 8/1991 | Swank | 29/446 |

OTHER PUBLICATIONS

U.S. Pat. Appln. Ser. No. 738,657 filed on Jul. 31, 1991, by H. R. Swank.

Primary Examiner—Edward L. Coles, Sr.
Assistant Examiner—Kim Yen Vu
Attorney, Agent, or Firm—Joseph S. Tripoli; Dennis H. Irlbeck; Vincent J. Coughlin, Jr.

[57] ABSTRACT

A cathode-ray tube comprises an evacuated envelope with a substantially rectangular faceplate panel and implosion protection structure disposed around the periphery of the panel to apply a compressive force thereto. The implosion protection structure includes a tube-contacting portion and an overlapping portion extending at least partially along the tube-contacting portion to provide a double thickness of material to increase the effective cross-sectional area of the implosion protection structure. The implosion protection structure is improved by at least one opening formed through one of the portions thereof. Mounting lugs overlie the opening in the one portion of the implosion protection structure and are secured to the other portion of the structure bounded within the opening. A method of securing the mounting lugs also is disclosed.

5 Claims, 5 Drawing Sheets

CATHODE-RAY TUBE HAVING IMPLOSION PROTECTION MEANS WITH A STRUCTURE AND METHOD TO FACILITATE ATTACHMENT OF TUBE MOUNTING MEANS This invention relates generally to cathode-ray tubes (CRT's) such as color television picture tubes, having implosion protection means, and, more particularly, to such tubes having implosion protection means with a double thickness portion that is modified to facilitate the attachment of mounting lugs thereto.

BACKGROUND OF THE INVENTION

A cathode-ray tube is evacuated to a very low internal pressure and, accordingly, is subject to the possibility of implosion due to the stresses produced by atmospheric pressure acting on all surfaces of the tube. This problem has been addressed in the art by providing the CRT with an implosion protection band. Such a band is used to apply a compressive force to the sidewall of a faceplate panel of the CRT to redistribute some of the forces. The redistribution of the forces decreases the probability of an implosion of the tube by minimizing tension in the corners of the panel. An implosion protection band is also beneficial because it improves the impact resistance of the tube. Glass in compression is stronger than glass which is in tension, and the band causes compression in panel areas which otherwise would be in tension. Additionally, in the event of an implosion, the redistributed stresses cause the imploding glass to be directed toward the back of the cabinet in which the tube is mounted, thereby substantially reducing the probability of someone in the vicinity of the imploding tube being injured.

The implosion protection band may be a so-called shrinkfit band, or a tension band which is applied either directly to the tube or to a pair of substantially U-shaped rimbands that overlie the sidewall of the faceplate panel.

As the size of color television tubes increase, the stress produced by atmospheric pressure acting on the larger tubes also increases, resulting in the need for implosion protection bands that can apply a greater compressive force to the sidewall of the panel. One method of increasing the compressive force is to increase the cross-sectional area of the implosion protection band. However, this adds additional cost to the tube. A cost efficient way to increase the effective cross-sectional area of the band is to fold over at least a portion of the metal strip used to make the band, to provide a double thickness of band material.

A disadvantage of forming a double thickness band in this manner is that in some tube configurations it is necessary to attach the mounting lugs, which are used to mount the tube within the television receiver, to the double thickness portion of the band. Welding is the preferred method of attaching the mounting lugs to the band; however, the double thickness of material may shunt a portion of the welding current, resulting in higher energy welding requirements and splattering of a rust-inhibiting layer provided on the band. Consequentially, a reduction in the reliability of the weld occurs.

SUMMARY OF THE INVENTION

A cathode-ray tube comprises an evacuated envelope with a substantially rectangular faceplate panel and implosion protection means disposed around the periphery of said panel to apply a compressive force thereto. The implosion protection means includes a tube-contacting portion and an overlapping portion extending at least partially along the tube-contacting portion to provide a double thickness of material to increase the effective cross-sectional area of the implosion protection means. The implosion protection means is improved by a plurality of openings formed through one of the portions thereof. Tube mounting means overlie each of the openings in the one portion and are secured to the other portion of the implosion protection means bounded within the openings.

DESCRIPTION OF THE PREFERRED EMBODIMENTS

Figure 1:
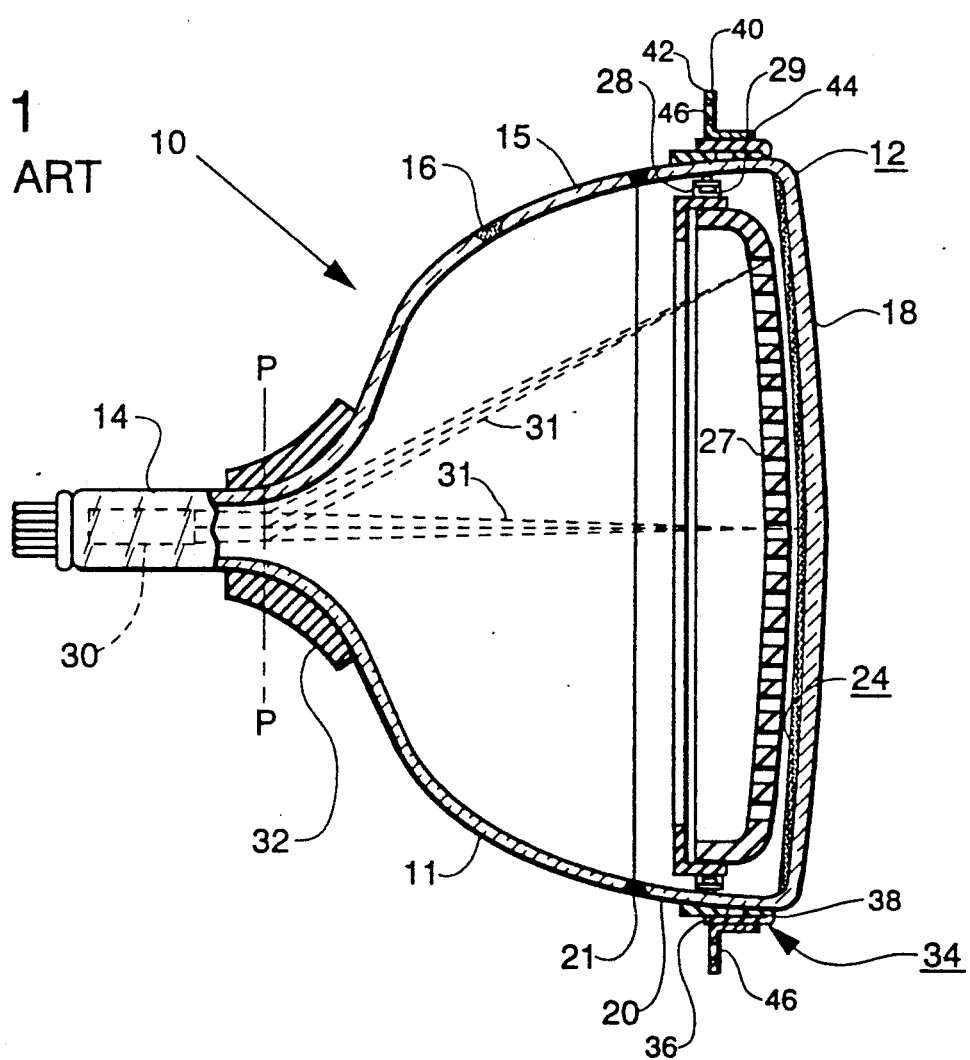
FIG. 1 is a plan view, partially in axial section, of a color CRT having implosion protection means.

FIG. 1 shows a color CRT 10, having a glass envelope 11 comprising a substantially rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate 18 and a peripheral flange or sidewall 20 which is sealed to the funnel 15 by a glass frit 21.

A three color phosphor screen 24 is carried on the inner surface of the faceplate 18. The screen 24, shown in FIGS. 3 and 5, preferably is a line screen which includes a multiplicity of screen elements comprised of red-emitting, green-emitting and blue-emitting phosphor stripes R, G and B, respectively, arranged in color groups or picture elements of three stripes or triads in a cyclic order, and extending in a direction which is generally normal to the plane in which the electron beams are generated. In the normal viewing position of the embodiment, the phosphor stripes extend in the vertical direction. Preferably, the phosphor stripes are separated from each other by a light absorbing matrix material 25, as is known in the art.

Alternatively, the screen can be a dot screen, or even a monochrome screen A thin conductive layer 26, preferably of aluminum, overlies the screen 24 and provides a means for applying a uniform potential to the screen as well as for reflecting light, emitted from the phosphor elements, through the faceplate 18. The screen 24 and the overlying aluminum layer 26 comprise a screen assembly.

With respect, again, to FIG. 1, a multi-apertured color selection electrode or shadow mask 27 is removably mounted in predetermined spaced relation to the screen assembly, by conventional means comprising a plurality of spring members 28 engaging studs 29 embedded in the sidewall 20. An electron gun 30, shown schematically by the dashed lines in FIG. 1, is centrally mounted within the neck 14, to generate and direct three electron beams 31 along convergent paths, through the apertures in the mask 27, to the screen 24. The gun 30 may be any type of CRT electron gun known in the art.

The tube 10 is designed to be used with an external magnetic deflection yoke 32, located in the region of the funnel-to-neck junction. When activated, the yoke 32 subjects the three beams 31 to magnetic fields which cause the beams to scan horizontally and vertically in a rectangular raster over the screen 24. The initial plane of deflection (at zero deflection) is shown by the line P—P in FIG. 1, at about the middle of the yoke 32. For simplicity, the actual curvatures of the deflection beam paths in the deflection zone are not shown.

Implosion protection means, such as a shrinkfit band, 34 is disposed around the periphery of the panel 12 to apply a compressive force thereto. The shrinkfit band may be formed from a continuous piece of steel, or from one or more steel strips joined at the ends. The dimensions of the band are expanded by stretching the band into a rectangular loop with rounded corners, as described in U.S. Pat. No. 5,036,577 issued on Aug. 6, 1991 to H. R. Swank. The periphery of the loop has cold dimensions slightly smaller than the periphery of the panel 12. The band 34 is heated to approximately 300° C. to 500° C. to cause it to expand to dimensions that permit the loop to be slipped around the sidewall 20. As the band cools, it shrinks and tightly surrounds the faceplate panel, thereby tensing the band which compresses the sidewall. The compressive force applied to the sidewall 20 can be accurately controlled by controlling the yield point and thickness of the band. Almost all forces are directed through the tensed band into the blend areas of the panel where the straight sidewall 20 blends into the curved edge of the panel 12, primarily at the corners where the band 34 is in contact with the corners of the panel sidewall. These inwardly directed compressive forces offset at least some of the outwardly directed tension forces which are produced on the faceplate corners by the atmospheric pressure on the faceplate, when the tube is evacuated.

In large size tubes, i.e., tubes having a diagonal faceplate dimension of 762 mm (30 inch), or larger, the thickness of the band material must be at least 1.5 to 2.5 mm (0.06 to 0.10 inch), to provide the required tension in the band. A drawback of such a band is the additional cost of the thicker material, because the portion of the band remote from the blend areas of the faceplate panel 12 contributes little to the inwardly directed compressive forces acting on the panel. Cost of the thicker band can be reduced if the band is made from thinner material that includes a folded-over portion that overlies the blend area of the panel. One such structure is shown in copending U.S. patent application Ser. No. 738,657 filed by H. R. Swank on Jul. 31, 1991, and assigned to the assignee of the present application. The band is formed from a strip of steel having an unfolded width of about 76 mm (3.0 inch) and a thickness within the range of 1.07 to 1.14 mm (0.042 to 0.045 inch). One edge of the strip is folded over to create an overlapping portion 36 that extends at least partially along a tube-contacting portion 38 to provide a double thickness of material to increase the effective cross-sectional area of the band. Typically, the amount of the overlap is about 25 mm (1.0 inch); however, the amount of overlap can be reduced, for example by trimming, to reduce the effective cross-sectional area of the band and, thus, its yield strength. Tube mounting means, such as a plurality of mounting lugs 40, each having an upstanding bracket 42 and a base 44, are secured, for example by welding or an equivalent means of attachment, to the band 34, adjacent to each of the corners. An aperture 46 is provided in each upstanding bracket 42 to permit the tube to be secured within a receiver (not shown).

In some tube configurations, the lugs 40 are attached either at the center or at the faceplate side of the band 34. These configurations require that the lugs be welded to the double thickness portion of the band. As previously described, it is difficult to repeatedly make a high-reliability weld to the double thickness of band material.

Figure 2:
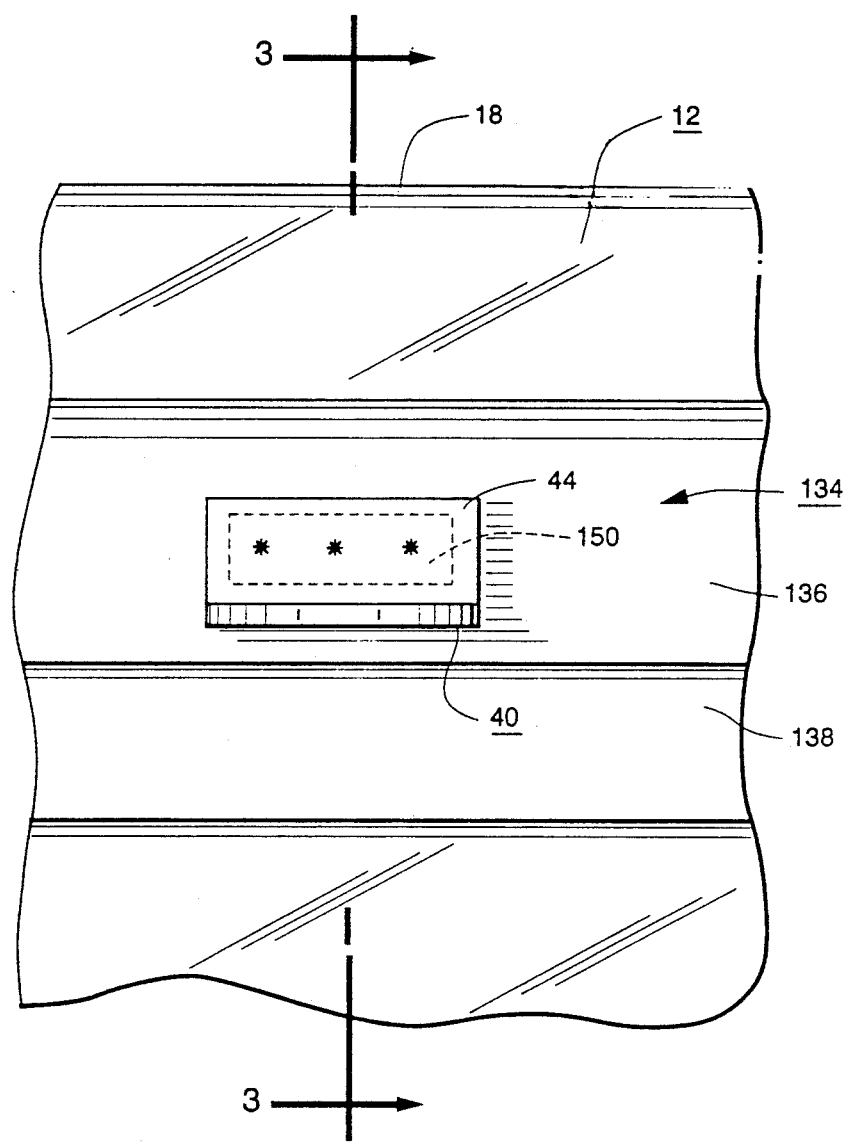
FIG. 2 is a plan view of one embodiment of the present invention.
Figure 3:
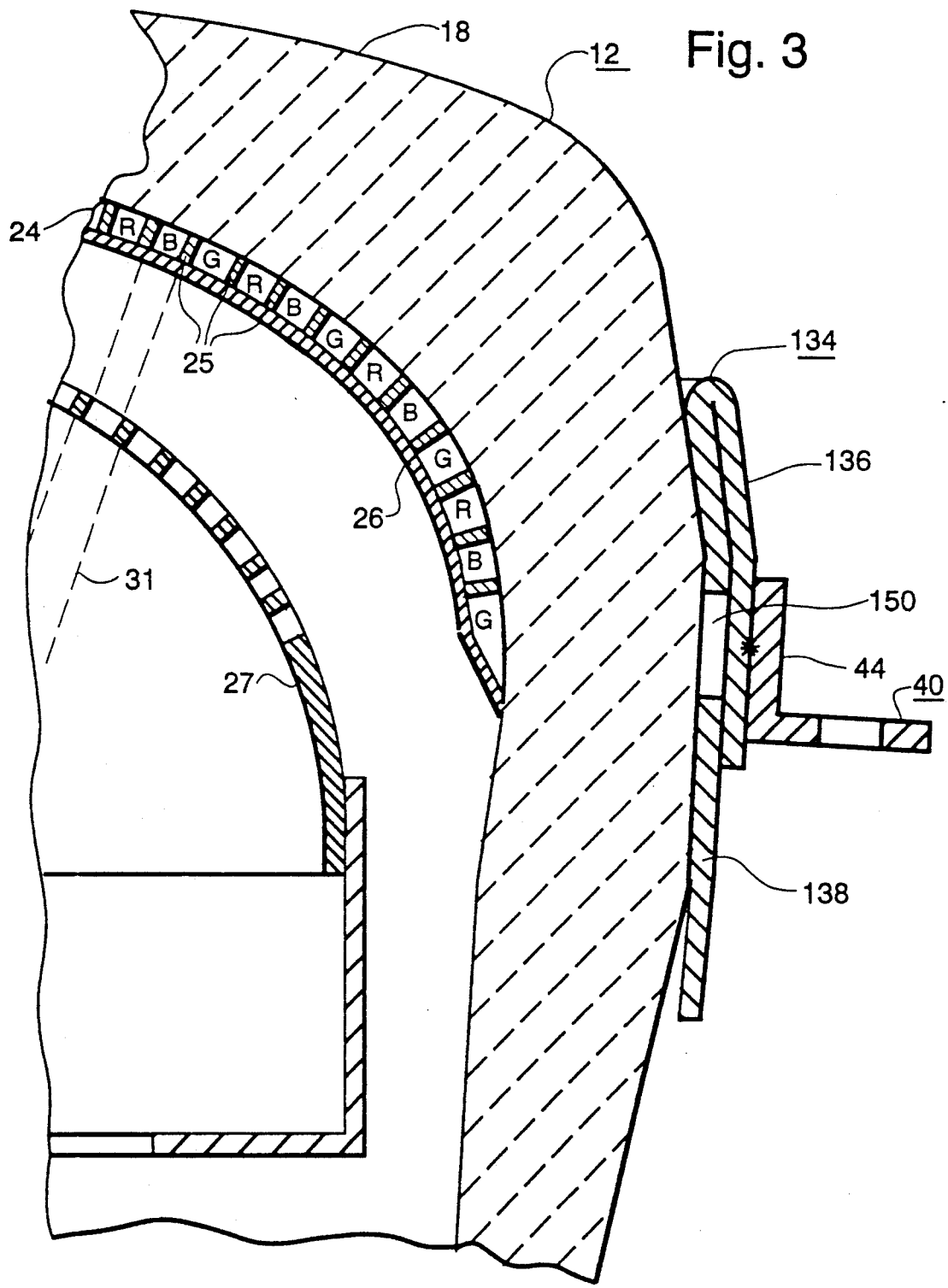
FIG. 3 is a sectional view taken along line 3—3 of FIG. 2.

The present invention ensures that lug welds are made to no more than one thickness of the band material. As shown in FIGS. 2 and 3, a plurality of openings 150 (only one of which is shown) are formed in the tube-contacting portion 138 of the novel band 134. The openings 150 are sufficiently large to accommodate one of the welding electrodes (not shown) which are used to secure the base 44 of the overlying lug 40 to the overlapping portion 136 of the band 134 bounded within the openings 150.

Figure 4:
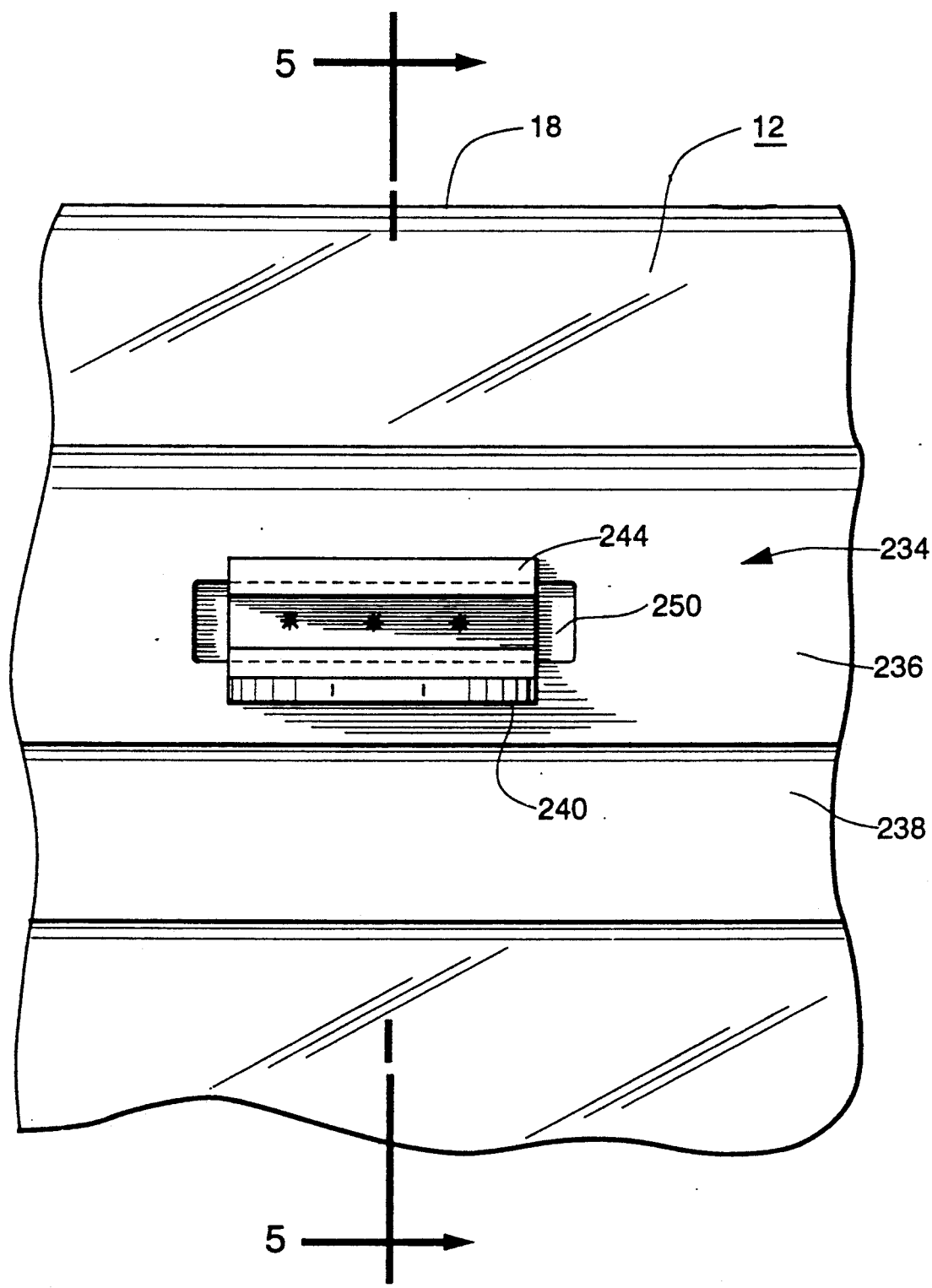
FIG. 4 is a plan view of a second embodiment of the present invention.
Figure 5:
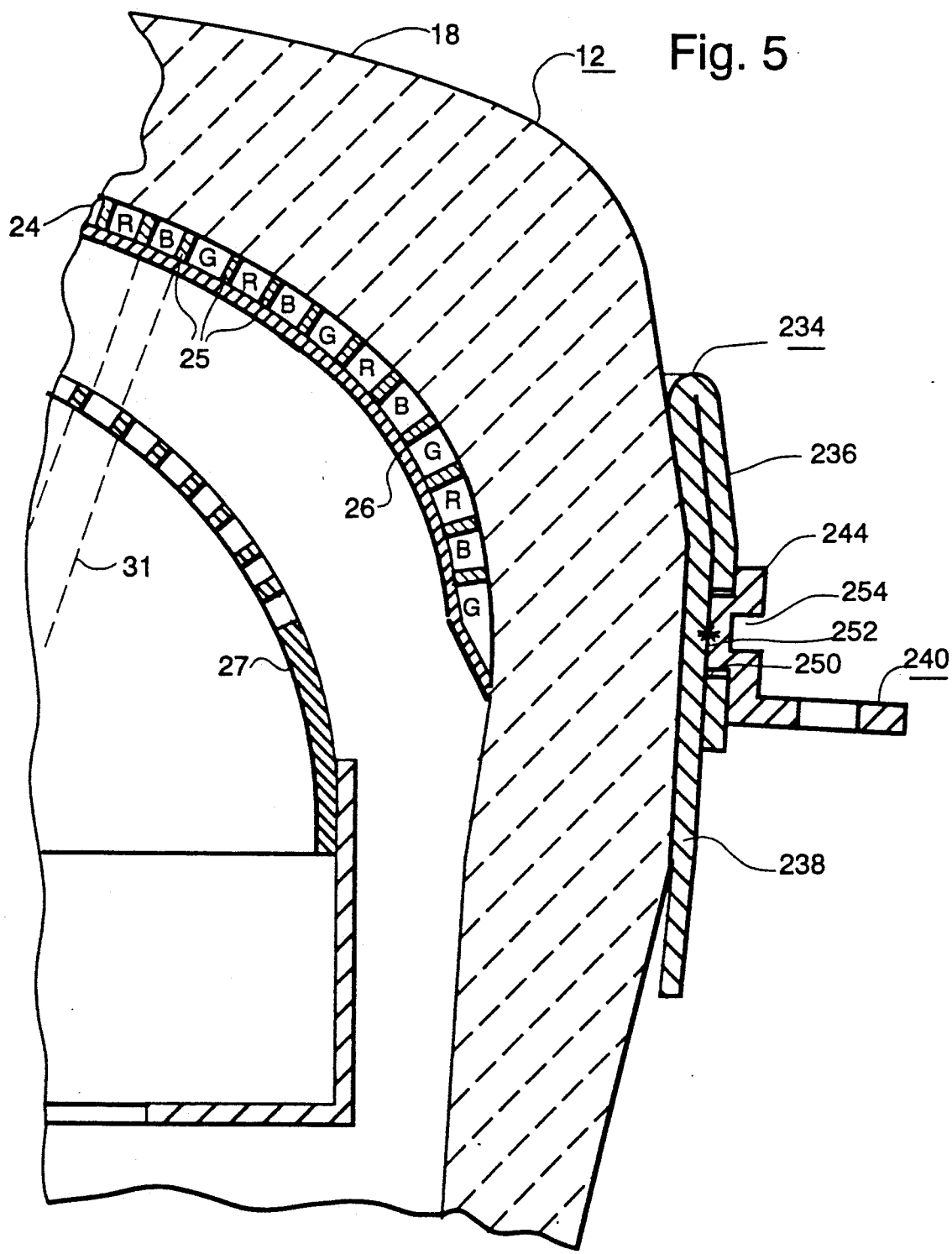
FIG. 5 is a sectional view taken along 5—5 of FIG. 4.

In a second embodiment of the invention, shown in FIGS. 4 and 5, the novel band 234 has a plurality of openings 250 formed in the overlapping portion 236 of the band. The openings are located adjacent to the corners of the band and have dimensions sufficient to accommodate a projection 252 formed in the base 244 of the lug 240. The projection 252 fits loosely within the opening 250 and can be laterally positioned as required. A depression 254, formed in the base 244, reduces the thickness of the base portion 244 of the lug 240 to a single thickness, to facilitate welding of the lug to the tube-contacting portion 238 of the band 234 that is bounded within the opening 250.

While the invention is described with respect to a shrinkfit band, it is not so limited; it can be used in conjunction with any type of implosion prevention means, such as rimbands, having a double thickness of material to which the tube mounting means are secured.

What is claimed is:

1. In a cathode-ray tube comprising an evacuated envelope with a substantially rectangular faceplate panel and implosion protection means disposed around the periphery of said panel to apply a compressive force thereto, said implosion protection means including a tube contacting portion and an overlapping portion extending at least partially along said tube contacting portion to provide a double thickness of material to increase the effective cross-sectional area of said implosion protection means, the improvement wherein said implosion protection means having at least one opening formed through one of said portions; and tube mounting means overlying said opening, said tube mounting means being secured to the other portion of said implosion protection means bounded within said opening.

2. The tube as described in claim 1, wherein said implosion protection means includes a shrinkfit band, said opening being formed in said tube contacting portion thereof.

3. The tube as described in claim 1, wherein said implosion protection means includes a shrinkfit band, said opening being formed in said overlapping portion thereof.

4. The tube as described in claim 3, wherein said tube mounting means includes at least one mounting lug having a base portion in contact with said overlapping portion of said shrinkfit band and an upstanding portion, said base portion having a projection extending into said opening and abutting said tube contacting portion of said shrinkfit band.

5. In a method of securing tube mounting means to implosion protection means disposed around the periphery of a substantially rectangular faceplate panel of a cathode-ray tube to apply a compressive force thereto, said implosion protection means including a tube contacting portion and an overlapping portion extending at least partially along said tube contacting portion, to provide a double thickness of material to increase the effective cross-sectional area of said implosion protection means, wherein the improvement comprises forming at least one opening through one of said portions of said implosion protection means, locating said tube mounting means to overlie said opening, and securing said tube mounting means to the other portion of said implosion protection means bounded within said opening.

UNITED STATES PATENT AND TRADEMARK OFFICE
CERTIFICATE OF CORRECTION

PATENT NO. : 5,233,432
DATED : August 3, 1993
INVENTOR(S) : Harry R. Swank

It is certified that error appears in the above-indentified patent and that said Letters Patent is hereby corrected as shown below:

Col. 1, line 8, after
"(CRT's)" add --,--.

Col. 1, line 41, change
"size" to --sizes--.

Signed and Sealed this

Nineteenth Day of April, 1994

Attest:

BRUCE LEHMAN

Attesting Officer

Commissioner of Patents and Trademarks